US008683886B2

(12) United States Patent
Hsu

(10) Patent No.: US 8,683,886 B2
(45) Date of Patent: Apr. 1, 2014

(54) SLIDING AUXILIARY DEVICE

(75) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 329 days.

(21) Appl. No.: 13/155,449

(22) Filed: Jun. 8, 2011

(65) Prior Publication Data
US 2012/0312108 A1   Dec. 13, 2012

(51) Int. Cl.
*F16H 1/00* (2006.01)

(52) U.S. Cl.
USPC .................................. 74/396; 74/397; 74/409

(58) Field of Classification Search
USPC ........ 74/395, 396, 397, 409, 411, 412 R, 413
See application file for complete search history.

(56) References Cited

U.S. PATENT DOCUMENTS

| | | | | | |
|---|---|---|---|---|---|
| 2,484,770 | A | * | 10/1949 | Worthen | 74/422 |
| 2,563,702 | A | * | 8/1951 | Benford | 359/383 |
| 2,876,652 | A | * | 3/1959 | Pankonin | 74/395 |
| 3,026,740 | A | * | 3/1962 | Covert | 74/395 |
| 3,180,168 | A | * | 4/1965 | Harris | 74/405 |
| 3,183,726 | A | * | 5/1965 | Badger | 74/10.8 |
| 3,220,276 | A | * | 11/1965 | Bruns | 74/409 |
| 5,159,848 | A | * | 11/1992 | Lawrence | 74/421 A |
| 5,679,088 | A | * | 10/1997 | Akashi | 475/296 |
| 5,931,263 | A | * | 8/1999 | Ericson et al. | 187/373 |
| 6,070,482 | A | * | 6/2000 | Kugio et al. | 74/354 |
| 6,810,760 | B2 | * | 11/2004 | Sye et al. | 74/405 |
| 6,978,959 | B2 | * | 12/2005 | Takasaka | 242/356 |
| 7,168,336 | B2 | * | 1/2007 | Lin | 74/413 |
| 7,234,369 | B2 | * | 6/2007 | Bartosch | 74/397 |
| 7,249,760 | B2 | * | 7/2007 | Liu et al. | 271/114 |
| 7,464,619 | B2 | * | 12/2008 | Vetter | 74/396 |
| 7,469,851 | B2 | * | 12/2008 | Bartosch | 241/101.2 |
| 7,581,463 | B2 | * | 9/2009 | Jacobs et al. | 74/406 |
| 7,681,876 | B2 | * | 3/2010 | Silverbrook et al. | 271/10.01 |
| 7,731,172 | B2 | * | 6/2010 | Yano | 271/10.09 |
| 7,748,288 | B2 | * | 7/2010 | Chevalier et al. | 74/409 |
| 8,011,410 | B2 | * | 9/2011 | Huang | 156/541 |
| 8,515,308 | B2 | * | 8/2013 | Awano | 399/111 |

* cited by examiner

*Primary Examiner* — David M Fenstermacher
(74) *Attorney, Agent, or Firm* — Rosenberg, Klein & Lee

(57) ABSTRACT

A sliding auxiliary device includes an assembly of a rotating wheel, a gate linked to the rotating wheel, and a toggle mechanism. The toggle mechanism includes a first arm pivoted to the rotating wheel, a second arm pivoted to the first arm, and an elastic member disposed between the first arm and the second arm. The rotating wheel substantially drives the first arm and the second arm of the toggle mechanism to relatively move to store energy in the elastic member, and the elastic member releases the stored energy to generate an acting force to assist the rotation of the rotating wheel after the first arm of the toggle mechanism crosses over a reference axial line, to obtain an improved operation smoothness better than the conventional skills.

29 Claims, 6 Drawing Sheets

SLIDING AUXILIARY DEVICE

BACKGROUND OF THE INVENTION

1. Field of the Invention

The present invention relates to a sliding auxiliary device for an electronic device, and in particular relates to a sliding auxiliary device assembled with a movable or sliding body, capable of assisting the movable body in increasing the stableness and reducing shakiness when the fitting process is performed.

2. Description of the Related Art

For a conventional sliding cover system equipped in electronic devices such as mobile phones, notebook computers, personal digital assistants, digital cameras, e-books, etc., the sliding cover system can be reciprocally moved or slid by an external force, and a sliding cover portion of the sliding cover system is simply moved for the purpose of opening or closing.

As to the operation and movement of these kinds of sliding cover modules or sets, it is usually required cooperative components such as a movable rack, a linking plate, several elastic members, and wires or particular guide rails designed for linking and traction to assist with their opening or closing process. For the movable body of the electronic device with a heavy weight or a large movement distance, it is not expected that the motion stability of the sliding cover set or mechanism is influenced by the possible shakiness or swing when the movable body of the electronic device is operated by an user (e.g., applying with a single side-pushing force).

Accordingly, some following topics of these kinds of sliding cover modules with respect to the actual operation movement shall be considered or overcome.

1. To possibly reduce the shakiness or swing of the sliding cover set, the sliding cover set shall be first equipped with an auxiliary device to assist in enhancing the stableness of sliding cover.

2. The structure of the auxiliary device shall be provided with a reliable design of mechanism to assist in enhancing the motion stability and strength of the described components of the movable rack, the linking plate, the elastic members and the wires designed for linking and traction, so that the motion stability and smoothness of the sliding cover set can be relatively increased. Particularly, the auxiliary device shall be able to incorporate with a movable body of an electronic product with heavy weight and large movement distance.

Typically speaking, these reference data described above are related to the applications and design of structure of the sliding cover module or the related components thereof. However, these reference data are failed to physically teach or disclose that how to improve the conventional skills on decreasing the shakiness or swing of the sliding cover set and increasing the motion stability when the sliding cover module is operated.

Thus, it is essential to redesign a sliding cover and the related components, use patterns and applications thereof to be unique from that of the conventional skills.

BRIEF SUMMARY OF THE INVENTION

Accordingly, the main purpose of the invention is to provide a sliding auxiliary device to solve the difficulties and improve operation smoothness of the conventional skills. The sliding auxiliary device comprises an assembly of a rotating wheel, a gate linked to the rotating wheel, and a toggle mechanism. The toggle mechanism, assembled to the rotating wheel to define a reference axial line, comprises a first arm pivoted to the rotating wheel, a second arm pivoted to the first arm, and an elastic member disposed between the first arm and the second arm. The rotating wheel substantially drives the first arm and the second arm of the toggle mechanism to relatively move to store energy in the elastic member, and the elastic member releases the stored energy to generate an acting force to assist the rotation of the rotating wheel after the first arm of the toggle mechanism crosses over the reference axial line, to obtain an improved operation smoothness better than the conventional skills. The first arm of the toggle mechanism is defined with a first end eccentrically pivoted to the rotating wheel and a second end, and the second arm of the toggle mechanism is defined with a first end and a second end connected to the second end of the first arm to attach the elastic member therewith. Further, the first end of the second arm of the toggle mechanism is fixed or pivoted to a carrier or an auxiliary plate. Thus, when the first end of the first arm carried by the rotation of the rotating wheel is move, the second end of the first arm and the second end of the second arm force the elastic member to store energy therein, and the elastic member releases the stored energy to generate an acting force to assist with the rotation of the rotating wheel after the first arm crosses over the reference axial line.

According to the sliding auxiliary device of the invention, the gate is a type of a plate, producing a linear displacement relative to the rotating wheel in rotation. That is to say, when the gate actuated by an external force produces the linear displacement to relatively rotate the rotating wheel, the elastic member becomes to store energy therein or release energy therefrom.

According to the sliding auxiliary device of the invention, the rotating wheel, the gate linked to the rotating wheel, and the toggle mechanism of the sliding auxiliary device can be applied to a sliding cover module (or a sliding cover set). The sliding cover module comprises a substrate provided with a sliding rail, a belt wheel disposed on the substrate, a follower wheel arranged on the substrate to respectively engage to the belt wheel and the rotating wheel and driven by the belt wheel, a sliding rack movably attached to the sliding rail of the substrate, and a wire wound between the belt wheel and the sliding rack. When the sliding rack driven by the sliding cover set is reciprocally moved, the sliding racks drives the wire to rotate the belt wheels, so that the two follower wheels driven by the belt wheels drive the rotating wheels to rotate, respectively. When the rotating wheels are rotated, the rotating wheels drive the toggle mechanisms to store energy in or release the stored energy from the elastic member. That is, the rotating wheels, the gate and the toggle mechanisms provide an acting force to assist in moving the sliding cover module. Further, the design of structure of the rotating wheel, the gate and the toggle mechanism is therefore more compact and stable.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and shall not be taken in a limiting sense. The scope of the invention is best determined by reference to the appended claims.

Figure 1:
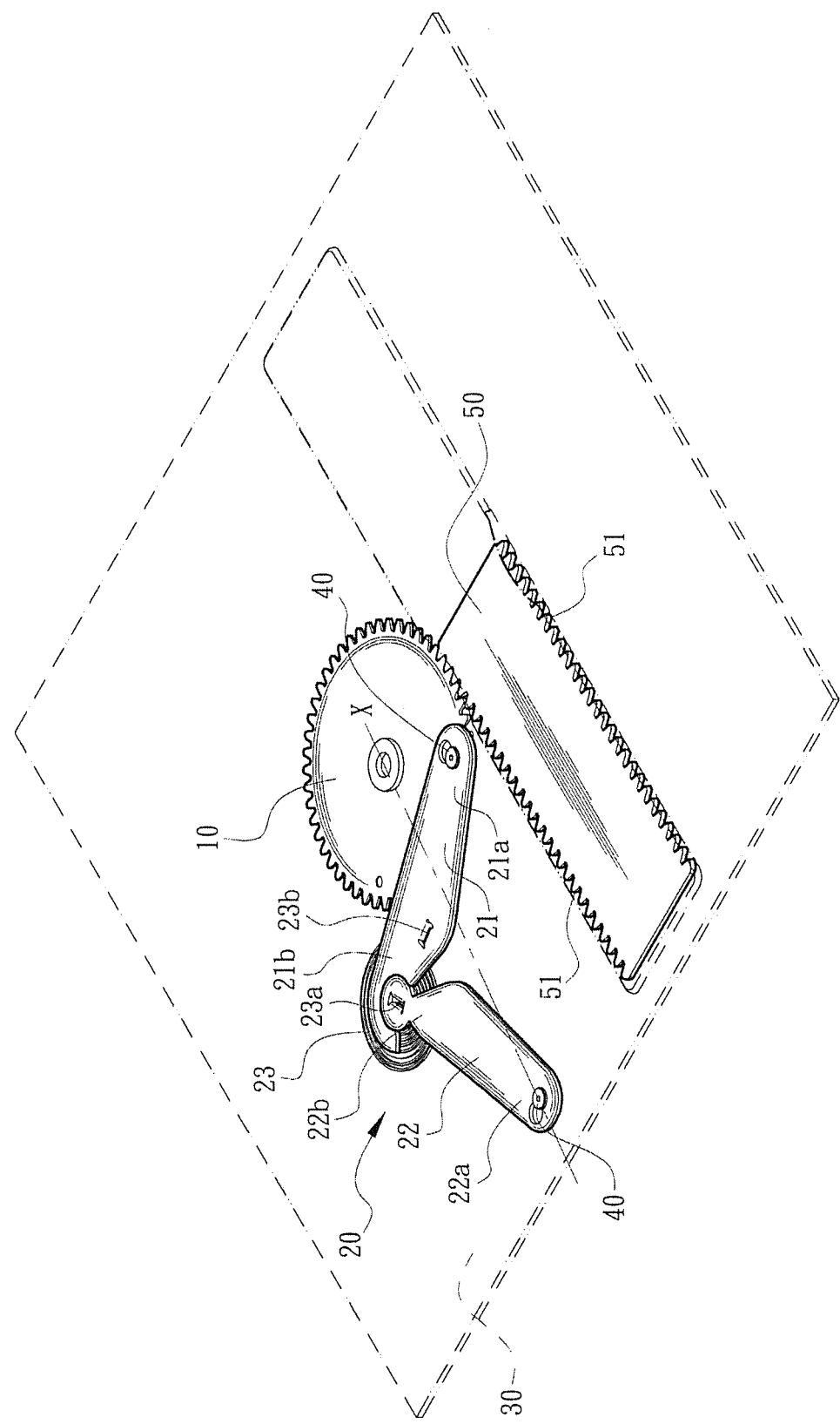
FIG. 1 is a schematic view of an assembly of a rotating wheel, a toggle mechanism and a gate according to an embodiment of the present invention, representing that these components can be arranged on a carrier illustrated by imaginary line.
Figure 2:
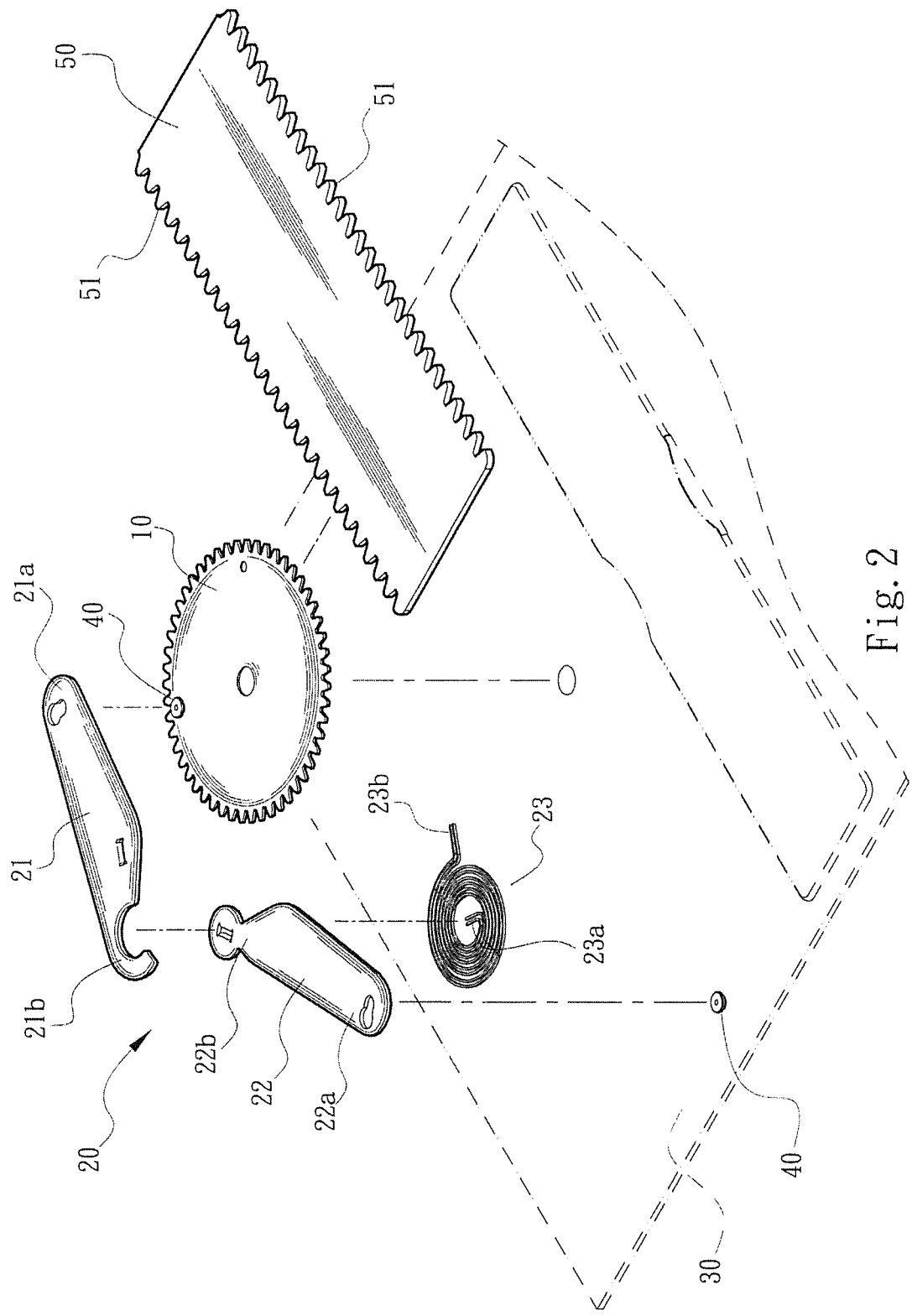
FIG. 2 is an exploded schematic view of the structure of FIG. 1.

Referring to FIGS. 1 and 2, a sliding auxiliary device of the invention comprises an assembly of a rotating wheel and a toggle mechanism, represented by reference numbers 10 and 20, respectively. In the adopted embodiments, the rotating wheel 10 is the type of gear. The rotating wheel 10 can be fixed on a substrate 30 illustrated by imaginary line, to be a type of free rotation.

In FIGS. 1 and 2, the toggle mechanism 20 comprises a first arm 21 pivotally assembled to the rotating wheel 10, a second arm 22 pivoted to the first arm 21, and an elastic member 23 disposed between the first and second arm 21 and 22. Specifically, in the toggle mechanism 20, the first arm 21 is defined with a first end 21a eccentrically pivoted to the rotating wheel 10 and a second end 21b, and the second arm 22 is defined with a first end 22a and a second end 22b connected to the second end 21b of the first arm 21 to attach the elastic member 23 therewith. The first end 22a of the second arm 22 of the toggle mechanism 20, functionally served as a positioning end, is rotatably and movably pivoted to or fixed at a carrier (e.g., a substrate 30 or an auxiliary plate), so that the first end 22a of the second arm 22 of the toggle mechanism 20 is at least rotatable and/or movable with respect to a fulcrum, i.e., a fixed or a pivoting site, formed on the carrier.

In a preferred embodiment, the sliding auxiliary device is defined with a reference axial line X as the toggle mechanism 20 is assembled to the rotating wheel 10. The reference axial line X corresponds to a connection line formed between a center of the rotating wheel 10 and the positioning end 22a of the second arm 22 or an extension line merging the connection line. Generally, the reference axial line X is arranged on the radial direction or position of the rotating wheel 10.

In the adopted embodiment, the first end 21a of the first arm 21 of the toggle mechanism 20 is provided with a first hole through which a first fastener 40 passes to pivot to the rotating wheel 10, and the first end 22a of the second arm 22 of the toggle mechanism 20 is provided with a second hole through which a second fastener 40 passes to pivot to the carrier 30. The second end 22b of the second arm 22 of the toggle mechanism 20 is provided with a round-head profile which is to be hooked by the second end 21b of the first arm 21 of the toggle mechanism 20 provided with a hook profile.

In this embodiment, the elastic member 23 is a type of torsion spring as presented in figures. The elastic member 23 comprises a pivotal end 23a attached to the second end 22b of the second arm 22 and a fixation end 23b attached to a position in the vicinity of the second end 21b of the first arm 21. In practice, the rotating wheel 10 drives the first arm 21 and the second arm 22 of the toggle mechanism 20 to relatively move, i.e., the second end 21b of the first arm 21 and the second end 22b of the second arm 22 of the toggle mechanism 20 force the elastic member 23 to store energy therein when the first arm 21 is moved by the rotation of the rotating wheel 10, and the elastic member 23 releases the stored energy to generate an acting force to assist with the rotation of the rotating wheel 10 after the first arm 21 crosses over the reference axial line X. The detailed description will be described hereinafter.

In one preferred embodiment, the rotating wheel 10 is interacted with a gate 50. Specifically, the gate 50 is a type of a plate (or a rack) having an edge portion provided with an insection 51 being a type of engaging to the rotating wheel 10, so that the gate 50 producing a linear displacement relative to the rotating wheel 10 in rotation. That is to say, when the gate 50 actuated by an external force produces the linear displacement to relatively rotate the rotating wheel 10, the elastic member 23 becomes to store energy therein or release the stored energy therefrom.

Figure 3:
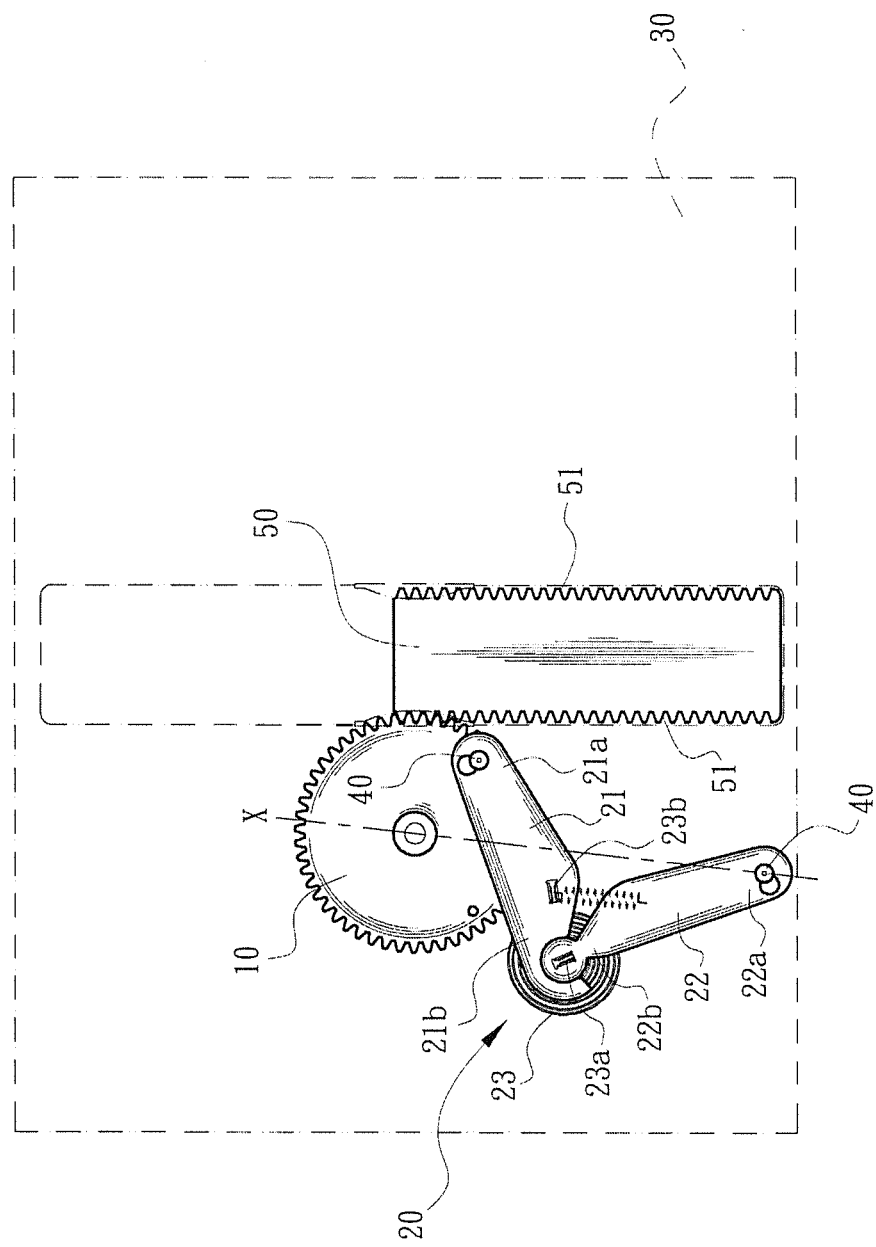
FIG. 3 is a plan schematic view of FIG. 1, representing that the toggle mechanism is in an initial position.

Referring to FIG. 3, in one preferred embodiment, the torsion spring can be replaced by a tension spring or a compression spring, illustrated by imaginary line, disposed between the first and second arms 21 and 22.

Figure 4:
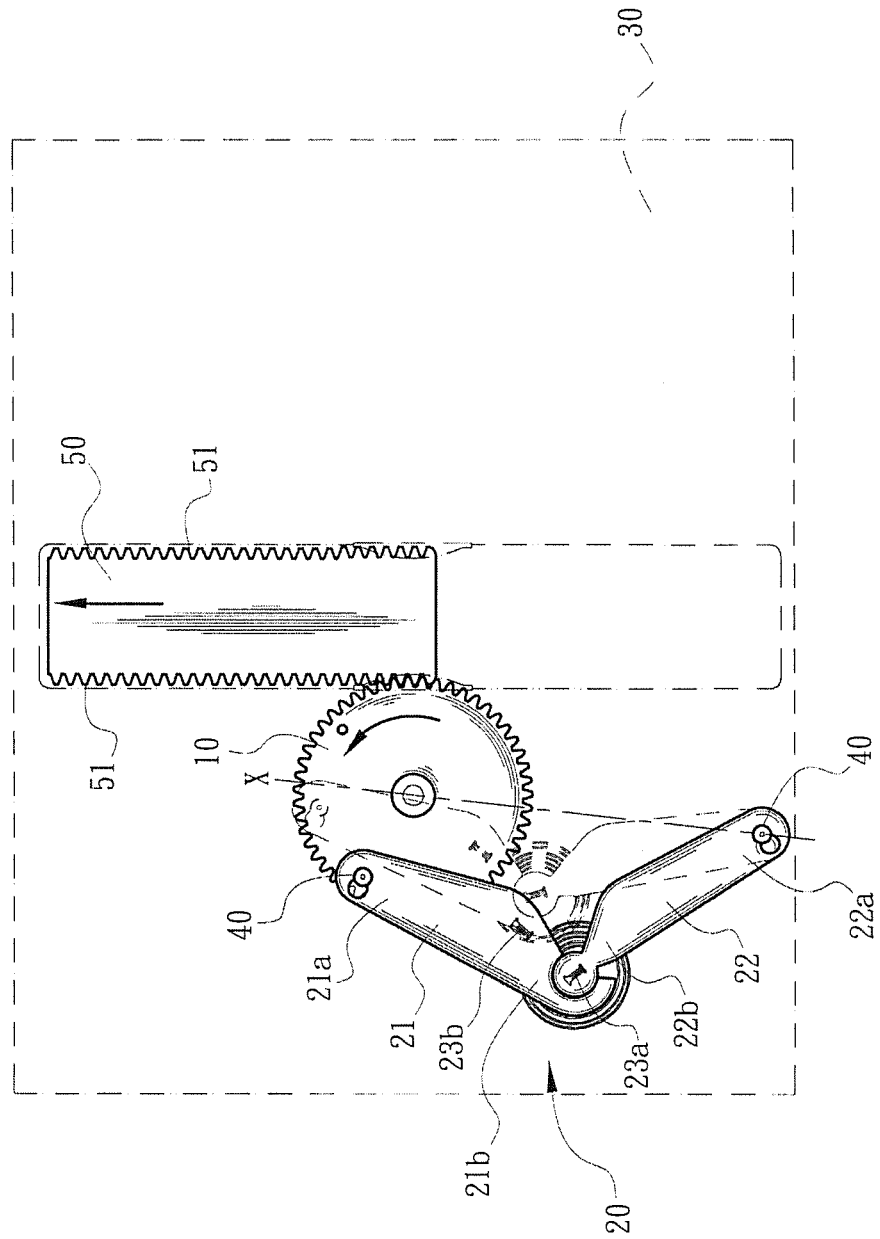
FIG. 4 is a schematic view of a motion of the rotating wheel, the toggle mechanism and the gate according to the present invention, wherein the toggle mechanism illustrated by imaginary line is crossed over a reference axial line.

Referring to FIGS. 3 and 4, the conditions of the rotating wheel 10, the toggle mechanism 20 and the gate 50 are illustrated. In FIG. 3, the position of the rotating wheel 10, the toggle mechanism 20 and the gate 50 is defined as an initial position or a first position. In FIG. 4, when the rotating wheel 10 driven by an external force is rotated (an arrow representing on the rotating wheel 10) in a counterclockwise direction, the gate 50 driven by the rotating wheel 10 is moved toward the top of this figure, and the first end 21a of the first arm 21 carried by the rotating wheel 10 is actually moved along a circumference path of the rotating wheel 10, to rotate and force the elastic member 23 to store energy therein, subjected to the rotation of both the second end 21b of the first arm 21 and the second end 22b of the second arm 22. When the first end 21a of the first arm 21 is moved to the reference axial line X, as illustrated by imaginary line in FIG. 4, the first and second arms 21 and 22 of the toggle mechanism 20 are stretched or almost reached to a distance having a maximum size or a farthest distance, i.e., the position that the elastic member 23 could be stored with largest energy.

In FIG. 4, after the first end 21a of the first arm 21 crosses over the reference axial line X with relation to the rotation of the rotating wheel 10, the first and second arms 21 and 22 of the toggle mechanism 20 is enforced to move toward a position defined as a second position illustrated by real line, functioned by the toggle mechanism 20 itself, and the elastic member 23 releases the stored energy to generate the acting force to assist with the rotation of the rotating wheel 10 through the first arm 21.

In FIG. 4, when the rotating wheel 10 is reversed in a clockwise direction to carry the first end 21a of the first arm 21 to move along the described circumference path of the rotating wheel 10, it is understood that the second end 21b of the first arm 21 and the second end 22b of the second arm 22 rotate and force the elastic member 23 to store energy therein; meanwhile, the gate 50 driven by the rotating wheel 10 is moved toward the bottom of this figure. After the first end 21a of the first arm 21 reversely crosses over the reference axial line X with relation to the rotation of the rotating wheel 10, the first and second arms 21 and 22 of the toggle mechanism 20 is enforced to move toward the first position of FIG. 3, functioned by the toggle mechanism 20 itself, and the elastic member 23 releases the stored energy to generate the acting force to assist with the rotation of the rotating wheel 10.

Figure 5:
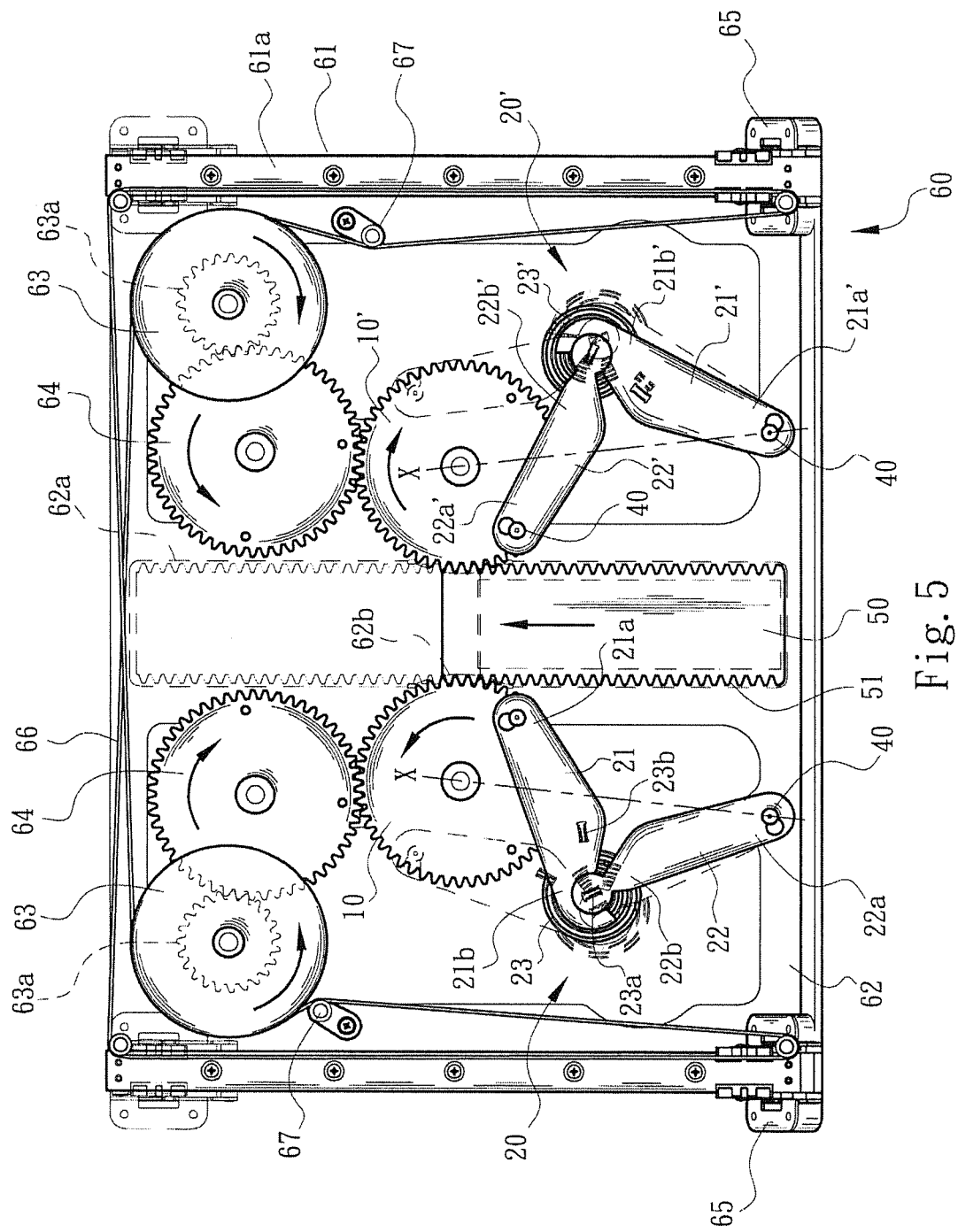
FIG. 5 is a schematic view of an assembly of rotating wheels, toggle mechanisms, a gate and a sliding cover module according to an embodiment of the present invention, representing that the sliding cover module illustrated by imaginary line is in an open position.

Referring to FIG. 5, an assembly of the rotating wheel 10, the toggle mechanism 20, the gate 50 and a sliding cover module (or sliding cover set 60) is represented. The sliding auxiliary device is disposed on the sliding cover module 60. In this embodiment, the two symmetrical rotating wheels 10 and 10' and the two symmetrical toggle mechanisms 20 and 20' are preferably adopted. The toggle mechanism 20' similarly comprises a first arm 21', a second arm 22', and an elastic member 23' disposed between the first and second arms 21' and 22'. Specifically, in the toggle mechanism 20', the second arm 22' has a first end 22a' eccentrically pivoted to the rotating wheel 10' and a second end 22b', the first arm 21' has a first end 21a' functionally served as a positioning end or point and a second end 21b' connected to the second end 22b' of the second arm 22' to attach the elastic member 23' therewith. A connection line formed between the positioning end (or the pivotal position of the first end 21a' of the first arm 21') and a center of the rotating wheel 10' is also defined as a reference axial line X.

In detail, the sliding cover module 60 comprises a substrate 61 provided with two sliding rails 61a, an auxiliary plate 62 attached to the substrate 61, two belt wheels 63 disposed on the substrate 61 and each of which provided with a toothed portion 63a, two follower wheels 64 arranged on the substrate 61 and each of which respectively engaged to the toothed portion 63a of the belt wheel 63 and the rotating wheel 10 or the rotating wheel 10' and driven by the belt wheel 63, two sliding racks or movable racks 65 movably attached to the sliding rails 61a of the substrate 61, and a wire 66 wound between the belt wheels 63 and the sliding racks 65. The substrate 61 is selected from the type of plates being integrally formed, capable of being arranged on a fixed body of an electronic device (not shown in FIGs.). The auxiliary plate 62 is provided with a grooved rail 62a and an opening 62b formed on the grooved rail 62a. The sliding racks 65 are arranged on a movable body of an electronic device (e.g., a sliding cover, but not shown in FIGs.). The sliding cover module 60 further comprises two tension pulleys 67 disposed on the auxiliary plate 62 to adjust the tension of the wire 66 wound between the belt wheels 63 and the sliding racks 65.

In FIG. 5, the gate 50, movably fitted in the grooved rail 62a of the auxiliary plate 62, has an edge portion provided with an insection 51 which is exposed outwardly from the opening 62b formed on the grooved rail 62a and to be a type of engaging to the rotating wheels 10 and 10'. In the preferred embodiment, the gate 50 can be pivoted on the movable body of the electronic device or the related components of the sliding cover module 60 (e.g., a flat cable or others). Further, the first end 22a of the second arm 22 of the toggle mechanism 20 and the first end 21a' of the first arm 21' of the toggle mechanism 20' are respectively pivoted on the auxiliary plate 62, functionally served as the positioning ends or points.

In FIG. 5, the position of the sliding cover module 60, together with the rotating wheels 10 and 10', the toggle mechanisms 20 and 20' and the gate 50, illustrated by real line, is an initial position defined as a first position or (sliding cover) closed position, and the position of the sliding cover module 60 illustrated by imaginary line is a final position defined as a second position or (sliding cover) open position.

When an user moves the sliding cover or the sliding cover module 60 from the closed position toward the open position to drive the sliding racks 65, the sliding racks 65 drives the wire 66 to rotate the belt wheels 63, so that the two follower wheels 64 driven by the belt wheels 63 drive the rotating wheels 10 and 10' to rotate, respectively. In FIG. 5, the belt wheels 63, the follower wheels 64 and the rotating wheels 10 and 10' are individually marked with an arrow thereon representing rotation direction thereof. When the rotating wheels 10 and 10' are rotated, the rotating wheels 10 and 10' drives the toggle mechanisms 20 and 20' and the gate 50 to form the same movement conditions depicted in FIGS. 3 and 4. After the first arm 21 of the toggle mechanism 20 and the second arm 22' of the toggle mechanism 20' cross over the reference axial lines X respectively, the acting forces which are generated by the toggle mechanisms 20 and 20' and released from the elastic members 23 and 23' assist the wire 66 in moving the sliding cover and help to move the sliding cover toward the open position, thereby offering the user with more labor-saving method to control the sliding cover compared to conventional skills.

In FIG. 5, when the user reverse the sliding cover module 60 from the second position (or open position) illustrated by imaginary line toward the first position (or closed position) illustrated by real line to move the sliding racks 65, the sliding racks 65 drives the wire 66 to rotate the belt wheels 63, so that the two follower wheels 64 driven by the belt wheels 63 drive the rotating wheels 10 and 10' to rotate, respectively. When the rotating wheels 10 and 10' are rotated, the rotating wheels 10 and 10' drives the toggle mechanisms 20 and 20' and the gate 50 to form the same movement conditions depicted in FIGS. 3 and 4. After the first arm 21 of the toggle mechanism 20 and the second arm 22' of the toggle mechanism 20' cross over the reference axial lines X respectively, the acting forces which are generated by the toggle mechanisms 20 and 20' and released from the elastic members 23 and 23' assist the wire 66 in moving the sliding cover and help to move the sliding cover toward the closed position, thereby offering the user with more labor-saving method to control the sliding cover compared to conventional skills.

That is, with the design of structure of the rotating wheels 10 and 10' and the toggle mechanisms 20 and 20', an acting force is provided to assist in moving the sliding cover module 60, thereby offering the user with labor-saving method to open or close the sliding cover or the sliding cover module 60.

Figure 6:
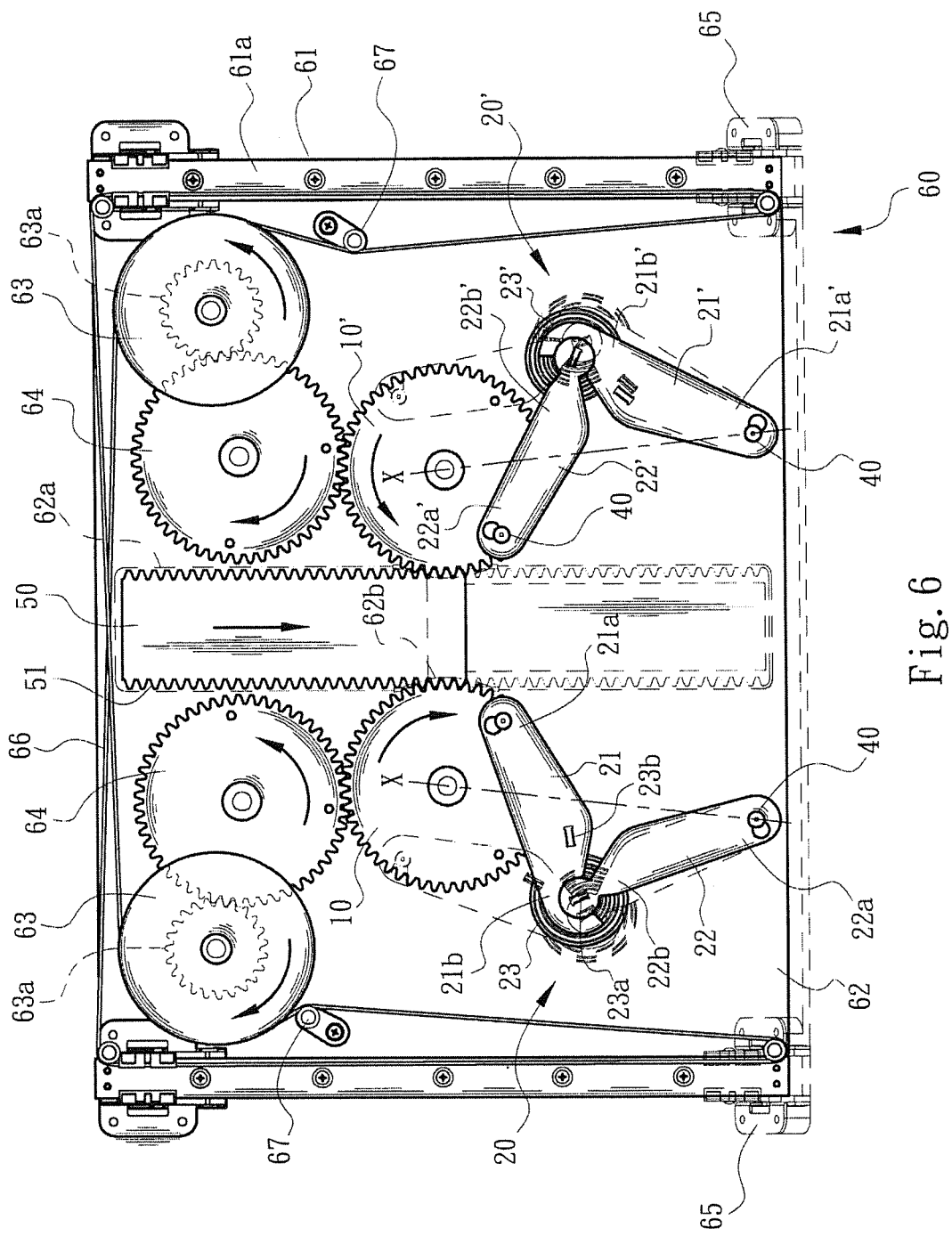
FIG. 6 is a schematic view of an assembly of rotating wheels, toggle mechanisms, a gate and a sliding cover module according to a modification embodiment of the present invention, representing that the sliding cover module illustrated by imaginary line is in an open position.

Note that the closed position (illustrated by real line) and the open position (illustrated by imaginary line) defined in FIG. 5 can be exchanged and embodied, for example, a modification embodiment of FIG. 6. In FIG. 6, the position of the sliding cover module 60, together with the rotating wheels 10 and 10', the toggle mechanisms 20 and 20' and the gate 50, illustrated by real line, is an initial position defined as a first position or (sliding cover) closed position, and the position of the sliding cover module 60 illustrated by imaginary line is a final position defined as a second position or (sliding cover) open position, wherein the gate 50 is located on the top of this figure.

When an user moves the sliding cover or the sliding cover module 60 from the closed position toward the open position to drive the sliding racks 65, the sliding racks 65 drives the wire 66 to rotate the belt wheels 63, so that the two follower wheels 64 driven by the belt wheels 63 drive the rotating wheels 10 and 10' to rotate, respectively. In FIG. 6, the belt wheels 63, the follower wheels 64 and the rotating wheels 10 and 10' are individually marked with an arrow thereon representing rotation direction thereof, and each of these components has an opposite rotation direction with respect to FIG. 5.

When the rotating wheels 10 and 10' are rotated, the rotating wheels 10 and 10' drives the toggle mechanisms 20 and 20' and the gate 50 to move, so that the gate 50 is moved from the top to the bottom in this figure. After the first arm 21 of the toggle mechanism 20 and the second arm 22' of the toggle mechanism 20' cross over the reference axial lines X respectively, the acting forces which are generated by the toggle mechanisms 20 and 20' and released from the elastic members 23 and 23' assist the wire 66 in moving the sliding cover and help to move the sliding cover toward the open position.

In FIG. 6, when the user reverses the sliding cover module 60 from the second position (or open position) illustrated by imaginary line toward the first position (or closed position) illustrated by real line, the sliding racks 65 is moved to drive the wire 66 to rotate the belt wheels 63, so that the two follower wheels 64 driven by the belt wheels 63 drive the rotating wheels 10 and 10' to rotate, respectively. When the rotating wheels 10 and 10' are rotated, the rotating wheels 10 and 10' drives the toggle mechanisms 20 and 20' and the gate 50 to reverse. After the first arm 21 of the toggle mechanism 20 and the second arm 22' of the toggle mechanism 20' cross over the reference axial lines X respectively, the acting forces which are generated by the toggle mechanisms 20 and 20' and released from the elastic members 23 and 23' assist the wire 66 in moving the sliding cover and help to move the sliding cover toward the closed position, thereby offering the user with more labor-saving method to control the sliding cover compared to conventional skills.

Typically speaking, with the co-operative movement of the sliding cover module 60, the sliding auxiliary device of the invention provided the following considerations and advantages compared to conventional skills.

By cooperating the rotating wheels 10 and 10', the first and second arm 21 and 22 of the toggle mechanisms 20, the first and second arm 21' and 22' of the toggle mechanisms 20', the elastic members 23 and 23', and the structural configuration of the gate 50 with the substrate 61 and the grooved rail 62a of the auxiliary plate 62 to provide a reliable design of structure, the motion stability and strength of the sliding cover module 60 can be auxiliary increased, and the smooth movement of the sliding cover module 60 can be enhanced.

Further, with the installation of the rotating wheels 10 and 10', the first and second arm 21 and 22 of the toggle mechanisms 20, the first and second arm 21' and 22' of the toggle mechanisms 20', the elastic members 23 and 23', and the structural configuration of the gate 50, for example, exact meshing transmission among the belt wheel 63, the follower wheel 64 and the rotating wheels 10 and 10', and the gate 50, shakiness or swing can be minimized when the sliding cover module 60 is operated by the user, especially of applying with a single side-pushing force, compared to the conventional skills. That is, the rotating wheels 10 and 10', the gate 50 and the toggle mechanisms 20 and 20' provide an acting force to assist in moving the sliding cover module 60 and a more compact and stable fitting structure therebetween.

More specifically, due to the sliding auxiliary device providing an acting force to assist in moving the sliding cover module 60, the sliding auxiliary device is particularly suitable for a movable body (or a sliding cover) of an electronic device with heavy weight and large size and movement distance.

The ranges of motion or working angle between the first and second positions of the toggle mechanisms 20 and 20' (e.g., of the first and second arm 21 and 22 and of the first and second arm 21' and 22') are related to the lengths of the first and second arm 21 and 22 and the lengths of the first and second arm 21' and 22'. That is, if the lengths of the first and second arm 21 and 22 of the toggle mechanism 20 and the lengths of the first and second arm 21' and 22' of the toggle mechanism 20' are changed (i.e., increased or decreased), the ranges of motion or working angle between the first and second arm 21 and 22 of the toggle mechanism 20 and between the first and second arm 21' and 22' of the toggle mechanism 20' are relatively changed.

To sum up, the invention provides an effective sliding auxiliary device with a particular space configuration much different from that in the conventional skills, and therefore the advantages and improvements of the invention certainly surpass the conventional skills.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sliding auxiliary device, comprising:
   a rotating wheel; and
   a toggle mechanism coupled to the rotating wheel to define a reference axial line, the toggle mechanism comprising a first arm, a second arm pivoted to the first arm, and an elastic member disposed between the first arm and the second arm,
   wherein at least one of the first arm and the second arm is eccentrically pivoted to the rotating wheel, the elastic member being coupled to alternatively resist and reinforce rotation of the rotating wheel based on angular position thereof relative to the reference axial line.

2. The sliding auxiliary device as claimed in claim 1, wherein the rotating wheel drives the first arm and the second arm of the toggle mechanism to relatively move to store energy in the elastic member, and the elastic member releases the stored energy to generate an acting force to assist the rotation of the rotating wheel after the first arm of the toggle mechanism crosses over the reference axial line.

3. The sliding auxiliary device as claimed in claim 1, wherein the first arm of the toggle mechanism is defined with a first end eccentrically pivoted to the rotating wheel and a second end, and the second arm of the toggle mechanism is defined with a first end and a second end connected to the second end of the first arm to attach the elastic member therewith.

4. The sliding auxiliary device as claimed in claim 3, wherein the first end of the second arm of the toggle mechanism is at least rotatably and movably pivoted to a carrier to functionally form a positioning end, and the reference axial line is located on a connection line between the positioning end and a center of the rotating wheel.

5. The sliding auxiliary device as claimed in claim 3, wherein the first end of the first arm of the toggle mechanism is provided with a first hole through which a first fastener passes to pivot to the rotating wheel, and the first end of the second arm of the toggle mechanism is provided with a second hole through which a second fastener passes to pivot to the carrier.

6. The sliding auxiliary device as claimed in claim 3, wherein the second end of the second arm of the toggle mechanism provided with a round-head profile is hooked by the second end of the first arm of the toggle mechanism provided with a hook profile.

7. The sliding auxiliary device as claimed in claim 3, wherein the elastic member comprises a pivotal end attached to the second end of the second arm of the toggle mechanism and a fixation end attached to a position in the vicinity of the second end of the first arm to attach the elastic member therewith.

8. The sliding auxiliary device as claimed in claim 1, wherein the elastic member comprises a torsion spring.

9. The sliding auxiliary device as claimed in claim 1, wherein the reference axial line is arranged on a radial position of the rotating wheel.

10. The sliding auxiliary device as claimed in claim 1, wherein the rotating wheel comprises a gear pivotally disposed on a substrate to rotate freely thereon.

11. The sliding auxiliary device as claimed in claim 1, wherein the rotating wheel is interacted with a gate, so that the gate produces a linear displacement relative to the rotating wheel in rotation.

12. The sliding auxiliary device as claimed in claim 11, wherein the gate comprising a plate has an edge portion provided with an insection being engaged to the rotating wheel.

13. The sliding auxiliary device as claimed in claim 1, wherein the first arm of the toggle mechanism is defined with a first end and a second end, and the second arm of the toggle mechanism is defined with a first end eccentrically pivoted to the rotating wheel and a second end connected to the second end of the first arm to attach the elastic member therewith.

14. The sliding auxiliary device as claimed in claim 13, wherein the first end of the first arm of the toggle mechanism is at least rotatably and movably pivoted to a carrier to serve as a positioning end, and the reference axial line is located on a connection line between the positioning end and a center of the rotating wheel.

15. The sliding auxiliary device as claimed in claim 1, wherein the sliding auxiliary device comprises two rotating wheels and two toggle mechanisms, and the two rotating wheels and the two toggle mechanisms are symmetrical about the gate.

16. The sliding auxiliary device as claimed in claim 1, wherein the sliding auxiliary device is disposed on a sliding cover module comprising a substrate provided with a sliding rail, a belt wheel disposed on the substrate, a follower wheel arranged on the substrate engaging the belt wheel, the rotating wheel engaged by the belt wheel, a sliding rack movably attached to the sliding rail of the substrate, and a wire wound between the belt wheel and the sliding rack.

17. The sliding auxiliary device as claimed in claim 16, wherein the sliding cover module further comprises an auxiliary plate attached to the substrate.

18. The sliding auxiliary device as claimed in claim 17, wherein the auxiliary plate of the sliding cover module is provided with a grooved rail and an opening formed on the grooved rail, and a gate fitted in the grooved rail of the auxiliary plate has an edge portion provided with an insection exposed outwardly from the opening formed on the grooved rail engaging the rotating wheel.

19. The sliding auxiliary device as claimed in claim 16, wherein the first arm of the toggle mechanism is defined with a first end and a second end, and the second arm of the toggle mechanism is defined with a first end pivoted to the substrate of the sliding cover module and a second end.

20. The sliding auxiliary device as claimed in claim 16, wherein the first arm of the toggle mechanism is defined with a first end pivoted to the substrate of the sliding cover module and a second end, and the second arm of the toggle mechanism is defined with a first end and a second end.

21. The sliding auxiliary device as claimed in claim 16, wherein the substrate of the sliding cover module is arranged on a fixed body of an electronic device.

22. The sliding auxiliary device as claimed in claim 16, wherein the sliding rack of the sliding cover module is arranged on a movable body of an electronic device.

23. The sliding auxiliary device as claimed in claim 16, wherein the belt wheel of the sliding cover module is provided with a toothed portion engaging the follower wheel.

24. The sliding auxiliary device as claimed in claim 16, wherein the sliding cover module further comprises a tension pulley disposed on the substrate.

25. The sliding auxiliary device as claimed in claim 17, wherein the sliding cover module further comprises a tension pulley disposed on the auxiliary plate.

26. The sliding auxiliary device as claimed in claim 17, wherein the first arm of the toggle mechanism is defined with a first end and a second end, and the second arm of the toggle mechanism is defined with a first end pivoted on the auxiliary plate of the sliding cover module and a second end.

27. The sliding auxiliary device as claimed in claim 17, wherein the first arm of the toggle mechanism is defined with a first end pivoted on the auxiliary plate of the sliding cover module and a second end, and the second arm of the toggle mechanism is defined with a first end and a second end.

28. The sliding auxiliary device as claimed in claim 1, wherein the elastic member comprises a tension spring.

29. The sliding auxiliary device as claimed in claim 1, wherein the elastic member comprises a compression spring.

* * * * *